United States Patent
Nonoyama

(10) Patent No.: US 10,468,692 B2
(45) Date of Patent: Nov. 5, 2019

(54) FUEL CELL AND METHOD OF MANUFACTURING FUEL CELL

(71) Applicant: TOYOTA JIDOSHA KABUSHIKI KAISHA, Toyota-shi, Aichi-ken (JP)

(72) Inventor: Nobuaki Nonoyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 132 days.

(21) Appl. No.: 15/422,160

(22) Filed: Feb. 1, 2017

(65) Prior Publication Data

US 2017/0229716 A1 Aug. 10, 2017

(30) Foreign Application Priority Data

Feb. 5, 2016 (JP) ................... 2016-020651

(51) Int. Cl.
| | |
|---|---|
| *H01M 8/0247* | (2016.01) |
| *H01M 8/0273* | (2016.01) |
| *H01M 8/0276* | (2016.01) |
| *H01M 8/0284* | (2016.01) |
| *H01M 8/2404* | (2016.01) |

(52) U.S. Cl.
CPC ....... *H01M 8/0273* (2013.01); *H01M 8/0247* (2013.01); *H01M 8/0284* (2013.01); *H01M 8/2404* (2016.02); *Y02P 70/56* (2015.11)

(58) Field of Classification Search
CPC .... H01M 2/02; H01M 2/0247; H01M 2/0273; H01M 2/0284; H01M 2/242; H01M 2008/1095; H01M 8/02; H01M 8/0247; H01M 8/0273; H01M 8/0276; H01M 8/0284; H01M 8/242; H01M 8/2404; Y02P 70/56
See application file for complete search history.

(56) References Cited

U.S. PATENT DOCUMENTS

| | | |
|---|---|---|
| 2011/0159398 A1 | 6/2011 | Farrington et al. |
| 2015/0311560 A1 | 10/2015 | Kageyama |
| 2018/0226660 A1 | 8/2018 | Kuwata et al. |

FOREIGN PATENT DOCUMENTS

| | | |
|---|---|---|
| EP | 2338196 A | 3/2010 |
| JP | 2006-019204 | 1/2006 |
| JP | 2007-250353 | 9/2007 |
| JP | 2013-251253 | 12/2013 |
| JP | 2014-053118 | 3/2014 |
| JP | 2014-067689 | 4/2014 |
| JP | 2014-67689 A | 4/2014 |
| JP | 2014-120226 A | 6/2014 |
| JP | 2014-120368 | 6/2014 |
| WO | WO 2010/030654 | 3/2010 |
| WO | WO 2014/080761 | 5/2014 |
| WO | WO 2017/006403 | 1/2017 |

OTHER PUBLICATIONS

Machine translation JP 2014-067689, published on Apr. 17, 2014 (Year: 2014).*

* cited by examiner

*Primary Examiner* — Anca Eoff
(74) *Attorney, Agent, or Firm* — Finnegan, Henderson, Farabow, Garrett & Dunner, LLP

(57) ABSTRACT

A technique of reducing the possibility that the thickness of an adhesive layer in a seal member becomes non-uniform is provided. There is provided a fuel cell comprising a membrane electrode gas diffusion layer assembly; a seal member; and a first separator and a second separator arranged to place the diffusion layer assembly and the seal member therebetween. The seal member includes a first adhesive layer facing the first separator, a second adhesive layer facing the second separator, and a core layer that is placed between, and is harder than, the first and second adhesive layers. Each of the first and second separators includes an opposed surface that faces the corresponding adhesive layer and a convex protruded from the opposed surface in a direction toward the seal member. A circumference of the convex in the opposed surface adheres to the corresponding facing adhesive layer.

5 Claims, 10 Drawing Sheets

FUEL CELL AND METHOD OF MANUFACTURING FUEL CELL

CROSS-REFERENCE TO RELATED APPLICATIONS

The present application claims priority from Japanese patent application 2016-020651 filed on Feb. 5, 2016, the entirety of the disclosure of which is hereby incorporated by reference into this application.

BACKGROUND

The present disclosure relates to a fuel cell.

In a conventionally known configuration of a fuel cell, a membrane electrode gas diffusion layer assembly that includes a membrane electrode assembly and gas diffusion layers and a seal member in a film-like form that is arranged in a periphery of the membrane electrode gas diffusion layer assembly are placed between a pair of separators (as described in, for example, JP 2014-120368A). The seal member includes a core portion and surface layers (adhesive layers) that are arranged on respective sides of the core portion. In a process of manufacturing the fuel cell, the surface layers of the seal member are melted and are then cured, so that opposed surfaces of the separators arranged to face the respective surface layers of the seal member adhere to the surface layers.

SUMMARY

In a conventional process of bonding the opposed surfaces of the separators to the surface layers of the seal member, pressing the entire opposed surfaces against the surface layers provides the possibility that the thickness of a pressed portion (adhesive portion) of the surface layer is significantly reduced. Significant reduction of the thickness of the adhesive portion may cause various problems as described below. For example, this may cause a problem that the adhesive force between the opposed surfaces and the adhesive portions is reduced. In another example, part of the adhesive portion pressed by the opposed surface may be flowed away to the periphery and may cause a problem that the thickness of the fuel cell becomes non-uniform. The non-uniform thickness of the fuel cell may prevent an inter-cell seal member such as a gasket that is placed between separators of an adjacent pair of fuel cells from exerting the originally expected sealing function. This may lead to the possibility that a reactive gas or a cooling medium flowing in the fuel cell is leaked out. There is accordingly a need for a technique that reduces the possibility that the thickness of the adhesive portion of the surface layer in the seal member is reduced significantly.

In order to solve at least part the problems described above, the disclosure may be implemented by aspects described below.

(1) According to one aspect of the disclosure, there is provided a fuel cell. This fuel cell comprises a membrane electrode gas diffusion layer assembly including a membrane electrode assembly in which electrodes are arranged on respective surfaces of an electrolyte membrane, and gas diffusion layers that are arranged on respective surfaces of the membrane electrode assembly; a seal member in a film-like form that is arranged in a periphery of the membrane electrode gas diffusion layer assembly; and a first separator and a second separator that are arranged such as to place the membrane electrode gas diffusion layer assembly and the seal member therebetween. The seal member includes a first adhesive layer that is arranged to face the first separator, a second adhesive layer that is arranged to face the second separator, and a core layer that is placed between the first adhesive layer and the second adhesive layer and is harder than the first adhesive layer and the second adhesive layer. The first separator includes a first opposed surface that is arranged to face the first adhesive layer and a first convex that is protruded from the first opposed surface in a direction toward the seal member to dent the first adhesive layer. The second separator includes a second opposed surface that is arranged to face the second adhesive layer and a second convex that is protruded from the second opposed surface in a direction toward the seal member to dent the second adhesive layer. A circumference of the first convex in the first opposed surface adheres to the first adhesive layer, and a circumference of the second convex in the second opposed surface adheres to the second adhesive layer. In the fuel cell of this aspect, the separator (first separator or second separator) includes the convex (first convex or second convex) that is protruded from the opposed surface (first opposed surface or second opposed surface) in the direction toward the seal member. This configuration causes the convex to bump into the core layer and thereby suppresses the first separator or the second separator from being further pressed toward the seal member. This reduces a pressing amount of the first separator or the second separator into the adhesive layer (first adhesive layer or second adhesive layer). This configuration accordingly reduces the possibility that the thickness of a region of the adhesive layer that adheres to the separator is significantly reduced, compared with a configuration that each opposed surface does not include a convex.

(2) In the fuel cell of the above aspect, the first convex and the second convex may be arranged at positions that are not opposed to each other across the seal member. In the fuel cell of this aspect, the first convex and the second convex are arranged at the positions that are not opposed to each other. This configuration reduces the likelihood that an excessive load is applied to part of the seal member.

(3) In the fuel cell of the above aspect, when a plurality of the fuel cells are stacked and a predetermined load is applied to the plurality of fuel cells in a stacking direction, the first convex may be arranged in a first specific region of the first separator that applies a higher load to the seal member, compared with a periphery of the first specific region in the first separator. The second convex may be arranged in a second specific region of the second separator that applies a higher load to the seal member, compared with a periphery of the second specific region in the second separator. The configuration of the fuel cell of this aspect causes the convex to reach the core layer and thereby suppresses displacement of the separator.

(4) In the fuel cell of the above aspect, each of the first specific region and the second specific region may be a region that is overlapped with an inter-cell seal member placed between an adjacent pair of the fuel cells, when the fuel cell is viewed along the stacking direction. In general, when a plurality of the fuel cells are stacked and a predetermined load is applied to the plurality of fuel cells in the stacking direction, a higher load is applied to the seal member via the separator in the region that is overlapped with the inter-cell seal member, compared with a periphery of the overlapped region. In the fuel cell of this aspect, the convex is provided in the specific region (first specific region or second specific region) of the separator that applies a higher load to the seal member. This configuration causes the convex to reach the core layer and thereby reduces the likelihood that the thickness of part of the adhesive layer is significantly reduced. This suppresses displacement of the separator.

(5) In the fuel cell of the above aspect, the core layer may be made of a first type of thermoplastic resin, and each of the first adhesive layer and the second adhesive layer may be made of a second type of thermoplastic resin that is different from the first type of thermoplastic resin. The core layer may have a higher Vicat softening temperature than the first adhesive layer and the second adhesive layer. Even when the fuel cell is placed in a temperature environment that is higher than the Vicat softening temperature of the first adhesive layer and the second adhesive layer and is lower than the Vicat softening temperature of the core layer, this configuration causes the convex to bump into the core layer and thereby reduces the possibility that the thickness of a region of the adhesive layer that adheres to the separator is significantly reduced.

(6) In the fuel cell of the above aspect, the core layer may be made of a thermoplastic resin, and each of the first adhesive layer and the second adhesive layer may be made of a thermosetting resin. In the fuel cell of this aspect, even when the convex of the separator dents the thermosetting resin prior to curing, this configuration causes the convex to bump into the core layer and thereby reduces the possibility that the thickness of a region of the adhesive layer that adheres to the circumference of the convex in the separator is significantly reduced.

(7) According to another aspect of the disclosure, there is provided a method of manufacturing a fuel cell. The method of manufacturing the fuel cell comprises: (a) a process of providing a membrane electrode gas diffusion layer assembly and a seal member in a film-like form, wherein the membrane electrode gas diffusion layer assembly includes a membrane electrode assembly in which electrodes are arranged on respective surfaces of an electrolyte membrane, and gas diffusion layers that are arranged on respective surfaces of the membrane electrode assembly; (b) a process of placing the seal member in a periphery of the membrane electrode gas diffusion layer assembly, after the process (a); and (c) a process of arranging a first separator and a second separator such as to place the membrane electrode gas diffusion layer assembly and the seal member therebetween, and bonding the seal member to the first separator and the second separator, after the process (b). The seal member includes a first adhesive layer that is arranged to adhere to the first separator, a second adhesive layer that is arranged to adhere to the second separator, and a core layer that is placed between the first adhesive layer and the second adhesive layer. The first separator includes a first opposed surface that is arranged to face the first adhesive layer and a first convex that is protruded from the first opposed surface. The second separator includes a second opposed surface that is arranged to face the second adhesive layer and a second convex that is protruded from the second opposed surface. The process (c) comprises: melting or softening part of the first adhesive layer; pressing the first convex and a first circumference of the first opposed surface that is arranged to surround the first convex, against the melted or softened part of the first adhesive layer; after the pressing the first circumference, curing the melted or softened part of the first adhesive layer, such that at least the first circumference is bonded to the first adhesive layer; melting or softening part of the second adhesive layer; pressing the second convex and a second circumference of the second opposed surface that is arranged to surround the second convex, against the melted or softened part of the second adhesive layer, and after the pressing the second circumference, curing the melted or softened part of the second adhesive layer, such that at least the second circumference is bonded to the second adhesive layer. In the method of manufacturing the fuel cell according to this aspect, the respective separators include the convexes. This configuration reduces the possibility that the thickness of a region of the adhesive layer that adheres to the separator is significantly reduced, compared with a configuration that each separator does not include a convex.

The disclosure may be implemented by any of various aspects other than the fuel cell and the method of manufacturing the fuel cell described above, for example, a separator used for the fuel cell, a fuel cell stack by stacking a plurality of the fuel cells, and a vehicle equipped with the fuel cell stack.

DESCRIPTION OF EMBODIMENTS

A. Configuration of Fuel Cell System 10

Figure 1:
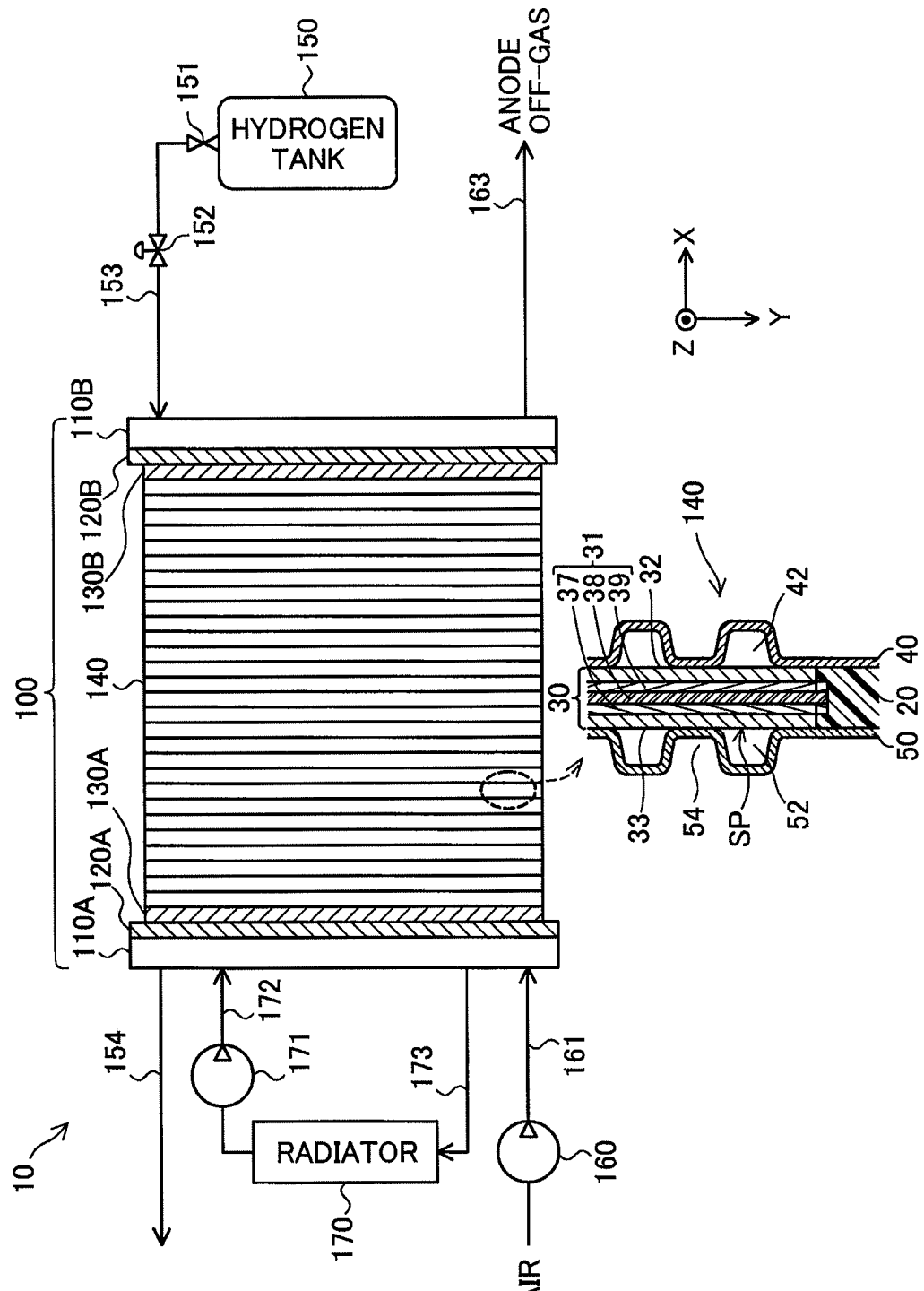
FIG. 1 is a diagram illustrating the general configuration of a fuel cell system according to an embodiment of the invention.

FIG. 1 is a diagram illustrating the general configuration of a fuel cell system 10 according to an embodiment of the invention. An X axis, a Y axis and a Z axis orthogonal to one another are illustrated in FIG. 1. An X axis, a Y axis and a Z axis corresponding to those of FIG. 1 are also illustrated in other drawings as needed. In FIG. 1, a −Y-axis direction denotes a vertically upward direction, and a +Y-axis direction denotes a vertically downward direction.

The fuel cell system 10 includes a fuel cell stack 100 as fuel cells. The fuel cell stack 100 has a stacked configuration in which an end plate 110A, an insulating plate 120A, a current collector 130A, a plurality of fuel cells (hereinafter also simply referred to as "cells") 140, a current collector 130B, an insulating plate 120B and an end plate 110B are stacked in this sequence. The direction of stacking the cells 140 is a direction along the X-axis direction. The plurality of cells 140 are clamped by application of a predetermined load (clamping load) in a compressing direction of the X-axis direction (stacking direction) from the end plates 110A and 110B on the respective sides.

Hydrogen as a fuel gas is supplied from a hydrogen tank 150 provided to store high-pressure hydrogen to the fuel cell stack 100 via a shutoff valve 151, a regulator 152 and piping 153. The unused fuel gas (anode off-gas) that is not consumed in the fuel cell stack 100 is flowed through discharge piping 163 and is discharged out of the fuel cell stack 100. The fuel cell system 10 may further include a recirculation mechanism configured to recirculate the anode off-gas to the piping 153-side. The air as an oxidizing gas is also supplied to the fuel cell stack 100 via an air pump 160 and piping 161. The unused oxidizing gas (cathode off-gas) that is not consumed in the fuel cell stack 100 is flowed through discharge piping 154 and is discharged out of the fuel cell stack 100. The fuel gas and the oxidizing gas are also called reactive gases.

A cooling medium cooled down by a radiator 170 is further supplied to the fuel cell stack 100 via a water pump 171 and piping 172, in order to cool down the fuel cell stack 100. The cooling medium discharged out of the fuel cell stack 100 is circulated through piping 173 to the radiator 170. The cooling medium used may be, for example, water, an antifreeze liquid such as ethylene glycol, or the air. According to this embodiment, water (also called "cooling water") is used as the cooling medium.

Each of the cells 140 provided in the fuel cell stack 100 includes a membrane electrode gas diffusion layer assembly (MEGA) 30 as a power generation module, a seal member 20 attached to a periphery of the MEGA 30, and a first separator 40 and a second separator 50 arranged to place the MEGA 30 and the seal member 20 therebetween.

The MEGA 30 includes a membrane electrode assembly (MEA) 31 and a pair of gas diffusion layers 32 and 33 arranged on respective surfaces of the MEA 31. The MEGA 30 is formed in a rectangular outer shape in the planar view. The MEA 31 includes an electrolyte membrane 38 and electrodes 37 and 39 arranged on respective surfaces of the electrolyte membrane 38. The electrolyte membrane 38 is formed in a rectangular outer shape in the planar view. The electrode 37 is an electrode on an anode side (anode-side electrode) and is placed on one surface of the electrolyte membrane 38. The electrode 39 is an electrode on a cathode side (cathode-side electrode) and is placed on the other surface that is opposite to the one surface of the electrolyte membrane 38. The second separator 50 is a separator on the anode side (anode-side separator) and includes a plurality of linear fuel gas flow paths 52 provided on its MEGA 30-side surface and a plurality of linear cooling medium distributed flow paths 54 provided on an opposite surface that is opposite to the MEGA 30-side surface. The first separator 40 is a separator on the cathode side (cathode-side separator) and includes a plurality of linear oxidizing gas flow paths 42 provided on its MEGA 30-side surface.

The seal member 20 is placed in the periphery (outer circumference) of the MEGA 30 in the planar view. The seal member 20 is made of a synthetic resin. The seal member 20 is in a film-like form and also in a frame-like form. The seal member 20 is joined with the periphery of the MEGA 30 such that the MEGA 30 is placed inside of the frame. The detailed configuration of the seal member 20 will be described later.

Figure 2:
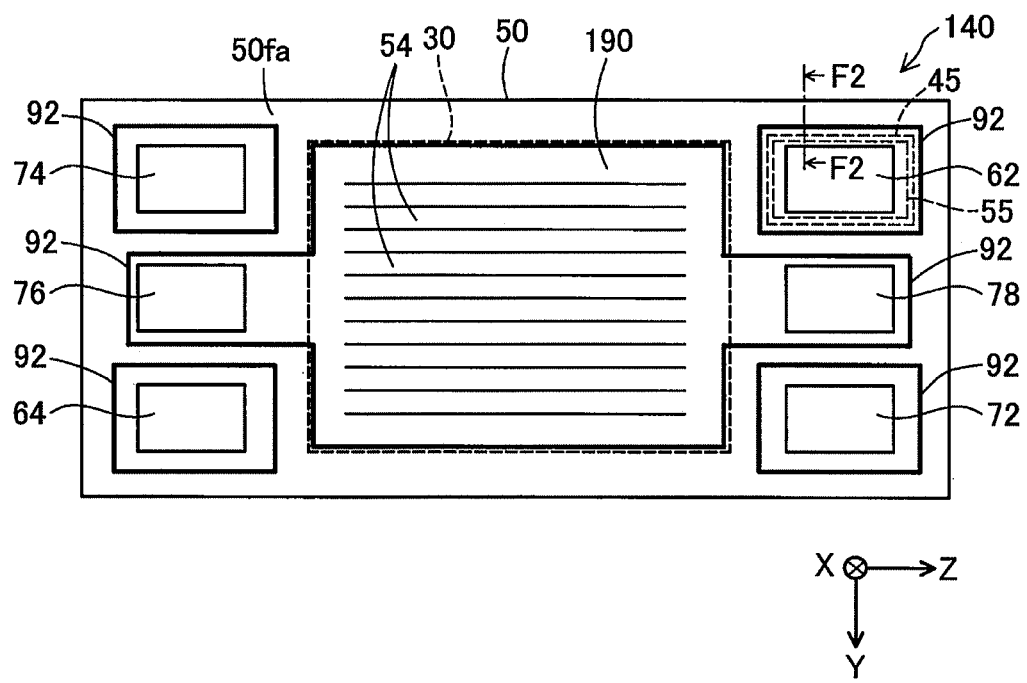
FIG. 2 is a schematic plan view illustrating a cell viewed from a second separator-side.
Figure 3:
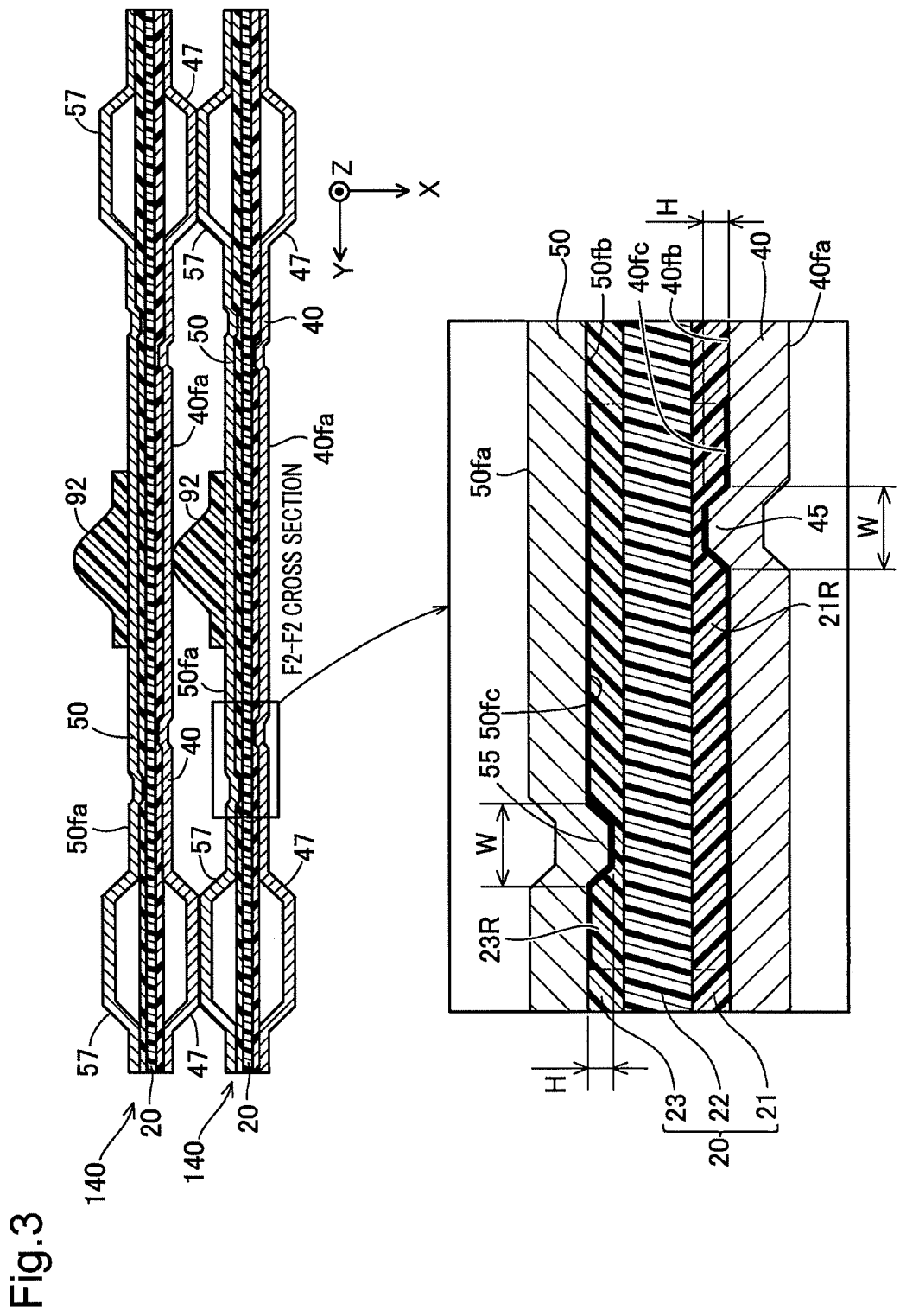
FIG. 3 is an F2-F2 sectional view of FIG. 2.

FIG. 2 is a schematic plan view illustrating the cell 140 that is viewed from the second separator 50-side. FIG. 3 is an F2-F2 sectional view of FIG. 2. In FIG. 2, the outer shape of the MEGA 30 and some of convexes 45 and 55 described later are shown by the broken line. FIG. 3 also illustrates an enlarged view of part of the sectional view below the F2-F2 sectional view. For the purpose of better understanding, the F2-F2 sectional view shown in FIG. 3 is a sectional view in the state that two adjacent cells 140 are stacked.

The first separator 40 and the second separator 50 are formed from members having the gas barrier properties and electrical conductivity. For example, the first separator 40 and the second separator 50 may be formed from carbon members of, for example, dense carbon formed by compressing carbon particles to be gas impermeable or formed from press-formed metal members of, for example, stainless steel or titanium steel or titanium. According to this embodiment, the first separator 40 and the second separator 50 are formed by press-forming titanium steel or titanium.

As shown in FIG. 2, the second separator 50 includes a fuel gas inlet manifold 62, a cooling medium outlet manifold 78 and an oxidizing gas inlet manifold 72 that are provided on one side relative to the cooling medium distributed flow paths 54. The second separator 50 also includes an oxidizing gas outlet manifold 74, a cooling medium inlet manifold 76 and a fuel gas outlet manifold 64 that are provided on the other side relative to the cooling medium distributed flow paths 54.

The fuel gas supplied through the piping 153 for the fuel cell (shown in FIG. 1) is distributed by the fuel gas inlet manifold 62 to the fuel gas flow paths 52 (shown in FIG. 1) of each of the cells 140. An unused portion of the fuel gas that is not used in the fuel gas flow paths 52 is then gathered to the fuel gas outlet manifold 64 and is discharged out of the fuel cell stack 100 through the discharge piping 163 (shown in FIG. 1). The oxidizing gas supplied through the piping 161 for the oxidizing gas (shown in FIG. 1) is distributed by the oxidizing gas inlet manifold 72 to the oxidizing gas flow paths 42 (shown in FIG. 1) of each of the cells 140. An unused portion of the oxidizing gas that is not used in the oxidizing gas flow paths 42 is then gathered to the oxidizing gas outlet manifold 74 and is discharged out of the fuel cell stack 100 through the discharge piping 154 (shown in FIG. 1).

In a plane of the second separator 50 viewed from the opposite side to the MEGA 30-side, the cooling medium inlet manifold 76, the cooling medium distributed flow paths 54 and the cooling medium outlet manifold 78 communicate with one another to constitute a cooling medium flow passage 190. The cooling medium supplied through the piping 172 for the cooling medium (shown in FIG. 1) is distributed by the cooling medium inlet manifold 76 to the cooling medium distributed flow paths 54 of each of the cells 140. The cooling medium is then gathered to the cooling medium outlet manifold 78 and is discharged out of the fuel cell stack 100 through the piping 173 (shown in FIG. 1).

The opening of each of the manifolds 62, 64, 72, 74, 76 and 78 is formed in an approximately rectangular shape. Manifold holes in similar shapes are also provided in the first separator 40 and the seal member 20, so that the respective manifolds (manifold holes) 62, 64, 72, 74, 76 and 78 form flow passages (manifolds) arranged to pass through the fuel cell stack 100 in the stacking direction.

The fuel cell stack 100 further includes gaskets 92 provided as inter-cell seal members placed between the respective adjacent cells 140. The gaskets 92 are placed to seal between the second separator 50 and a first separator of another adjacent cell 140. As shown in FIG. 2, the gaskets 92 are provided at a plurality of locations. The plurality of gaskets 92 are made of, for example, a rubber or a thermoplastic elastomer. The plurality of gaskets 92 are placed between the separators 40 and 50 of two adjacent cells 140 and tightly adhere to the two adjacent separators 40 and 50 to prevent leakage of the reactive gases and the cooling medium to the outside. The plurality of gaskets 92 are attached to and placed on an opposite surface 50fa of the second separator 50 that is opposite to a surface facing the MEGA 30 and the seal member 20. Some parts of the plurality of gaskets 92 are arranged to surround the manifolds 62, 64, 72 and 74. Another part of the plurality of gaskets 92 is arranged to surround the cooling medium flow passage 190.

As shown in FIG. 3, the seal member 20 includes a first adhesive layer 21, a second adhesive layer 23 and a core layer 22 that is placed between the first adhesive layer 21 and the second adhesive layer 23. The first adhesive layer 21 is placed to be adjacent to and in contact with one surface of the core layer 22, and the second adhesive layer 23 is placed to be adjacent to and in contact with the other surface of the core layer 22. Accordingly the seal member 20 has three-layered structure. The first adhesive layer 21 is arranged to face the first separator 40. The second adhesive layer 23 is arranged to face the second separator 50. The first adhesive layer 21 includes adhesive regions 21R (regions including thick line portions in the drawing) that adhere to the first separator 40. The second adhesive layer 23 includes adhesive regions 23R (regions including thick line portions in the drawing) that adhere to the second separator 50. The first adhesive layer 21 and the second adhesive layer 23 are used to respectively adhere to the facing first separator 40 and second separator 50, and the core layer 22 provides a foundation structure of the seal member 20. The core layer 22 has a smaller amount of deformation under application of a certain load than the adhesive layers 21 and 23 at a temperature to which the seal member 20 is exposed in the use environment of the fuel cell stack 100 and at a cell-forming temperature described later.

The first adhesive layer 21 and the second adhesive layer 23 may be made of a thermoplastic resin, for example, polypropylene or polyethylene mixed with a silane coupling agent or a modified polyolefin obtained by introducing a functional group to a polyolefin. A concrete example the thermoplastic resin is Admer (registered trademark) manufactured by Mitsui Chemicals, Inc. The first adhesive layer 21 and the second adhesive layer 23 may be made of a thermosetting resin, for example, polyisobutylene or an epoxy resin. The first adhesive layer 21 and the second adhesive layer 23 have the high adhesiveness to another material, in order to adhere to the corresponding first separator 40 and second separator 50 and provide the sealing property.

The core layer 22 is made of a thermoplastic resin. The core layer 22 may be made of, for example, polyethylene naphthalene (PEN) or polypropylene. The core layer 22 is harder than the two adhesive layers 21 and 23. More specifically, the core layer 22 is harder than the first adhesive layer 21 and the second adhesive layer 23 at a temperature (cell-forming temperature) in a bonding process to respectively bond the first adhesive layer 21 and the second adhesive layer 23 to the corresponding first separator 40 and second separator 50.

The cell-forming temperature is specified as described below, for example, when the core layer 22 is made of a first type of thermoplastic resin and the first adhesive layer 21 and the second adhesive layer 23 are made of a second type of thermoplastic resin that is different from the first type of thermoplastic resin. The cell-forming temperature denotes a heating temperature of a hot pressing machine (described later) used to bond the first adhesive layer 21 and the second adhesive layer 23 respectively to the first separator 40 and the second separator 50. In this case, the cell 140 meets the following condition 1:
<Condition 1>

The Vicat softening temperature of the core layer 22 is higher than the heating temperature of the hot pressing machine, and the Vicat softening temperature of the first adhesive layer 21 and the second adhesive layer 23 is lower than the heating temperature of the hot pressing machine.

Accordingly the core layer 22 has the higher Vicat softening temperature than that of the first adhesive layer 21 and the second adhesive layer 23. The Vicat softening temperature is measured in conformity with Japanese Industrial Standards JIS-K-7206.

When the core layer 22 is made of a thermoplastic resin and the first adhesive layer 21 and the second adhesive layer 23 are made of a thermosetting resin that is in the liquid form at room temperature (for example, at 25° C.) prior to curing, the cell-forming temperature denotes a temperature (for example, 25° C. to 40° C.) at which the first separator 40 and the second separator 50 are pressed against the two adhesive layers 21 and 23 by the hot pressing machine described later in a stage prior to a start of curing of the first adhesive layer 21 and the second adhesive layer 23 in the liquid form. This temperature in such pressing is lower than the Vicat softening temperature of the core layer 22. Accordingly the core layer 22 is harder than the first adhesive layer 21 and the second adhesive layer 23 at the cell-forming temperature.

As described above, the seal member 20 includes the first adhesive layer 21 and the second adhesive layer 23 that are softened or liquefied and the core layer 22 that is not softened or liquefied, at the cell-forming temperature when the seal member 20 is bonded to the first separator 40 and the second separator 50.

The first separator 40 includes an opposed surface 40$fb$ as a first opposed surface that is arranged to face the first adhesive layer 21, and an opposite surface 40$fa$ that is on the opposite side to the opposed surface 40$fb$. The opposed surface 40$fb$ is a planar surface. Portions of the opposed surface 40$fb$ that adhere to the first adhesive layer 21 are called adhesive opposed surfaces 40$fc$. The first separator 40 includes convexes 45 as first convexes that are protruded from the adhesive opposed surfaces 40$fc$ in a direction toward the seal member 20. In other words, the adhesive opposed surface 40$fc$ form a circumference of the convex 45 (also called "first circumference"). The convex 45 dents the first adhesive layer 21.

The second separator 50 includes an opposed surface 50$fb$ as a second opposed surface that is arranged to face the second adhesive layer 23, and an opposite surface 50$fa$ that is on the opposite side to the opposed surface 50$fb$. The opposed surface 50$fb$ is a planar surface. Portions of the opposed surface 50$fb$ that adhere to the second adhesive layer 23 are called adhesive opposed surfaces 50$fc$. The second separator 50 includes convexes 55 as second convexes that are protruded from the adhesive opposed surfaces 50$fc$ in a direction toward the seal member 20. In other words, the adhesive opposed surface 50$fc$ forms a circumference of the convex 55 (also called "second circumference"). The convex 55 dents the second adhesive layer 23. It is preferable that the convex 45 and the convex 55 are arranged at positions that are not opposed to each other across the seal member 20 (as shown in FIG. 3). In other words, when the cell 140 is viewed along the stacking direction of the plurality of cells 140, it is preferable that the convex 45 and the convex 55 are arranged alternately to be not overlapped with each other. This configuration reduces the possibility that an excessively high load is applied to some portions of the seal member 20 by these two convexes 45 and 55, for example, during the bonding process or in the clamped state of the fuel cell stack 100.

The first separator 40 and the second separator 50 respectively include inclination suppressing elements 47 and 57 that are provided in portions overlapping with the seal member 20 along the stacking direction and are configured to prevent inclination of the separators 40 and 50 in a direction perpendicular to the stacking direction. The inclination suppressing element 47 is protruded from the opposite surface 40fa of the first separator 40. The inclination suppressing element 57 is protruded from the opposite surface 50fa of the second separator 50. A leading end in the protruding direction of each of the inclination suppressing elements 47 and 57 forms a plane. In the fuel cell stack 100, the inclination suppressing element 57 is arranged to be in abutment with the inclination suppressing element 47 of the adjacent cell 140.

As shown in FIG. 2, each of the convexes 45 and 55 is formed to continue along each of the manifolds 62, 64, 72, 74, 76 and 78. More specifically, each of the convexes 45 and 55 is formed continuously without interruptions along each of the manifolds 62, 64, 72, 74, 76 and 78. As shown in FIG. 3, each of the convexes 45 and 55 has a trapezoidal sectional shape in a direction perpendicular to the direction in which the convex 45 or 55 is continuous. Each of the convexes 45 and 55 is protruded to a height H from the adhesive opposed surface 40fc or 50fc. The height H is preferably determined to ensure a thickness of the adhesive layer 21 or 23 that provides the sufficient adhesive force between the adhesive layer 21 or 23 and the separator 40 or 50 in the adhesive region 21R or 23R. This ensures the thickness of the adhesive region 21R or 23R at the level that provides the sufficient adhesive force when the separator 40 or 50 is pressed against the adhesive region 21R or 23R of the adhesive layer 21 or 23 by the hot pressing machine described later. According to this embodiment, the height H may be set, for example, in a range of 0.02 mm to 0.08 mm. A maximum width W in the sectional shape of each of the convexes 45 and 55 is preferably set to a level that prevents the adhesive layer 21 or 23 from being pressed away to the periphery by the convex 45 or 55 and thereby having a significantly non-uniform thickness. According to this embodiment, the maximum width W may be set, for example, in a range of 0.1 mm to 1.0 mm.

Figure 4:
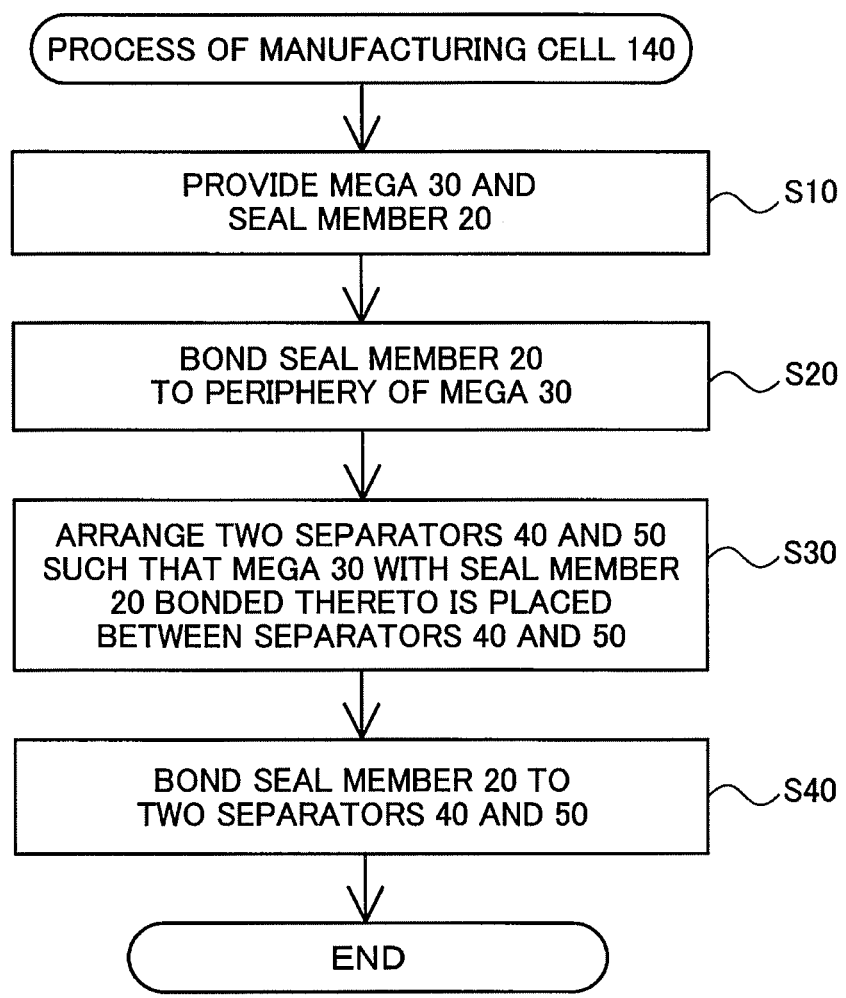
FIG. 4 is a process flowchart showing a process of manufacturing the cell.
Figure 5:
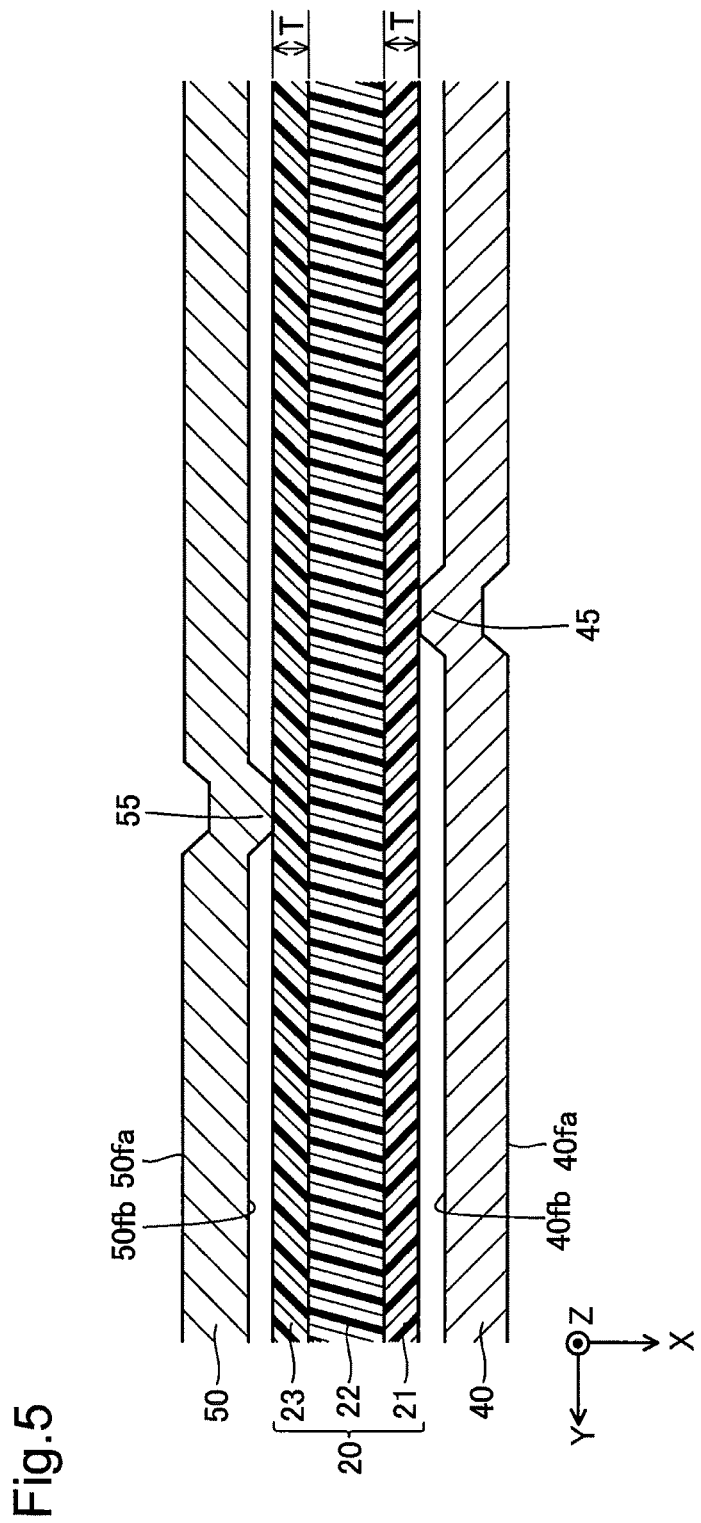
FIG. 5 is a diagram illustrating step S30 of FIG. 4.
Figure 6:
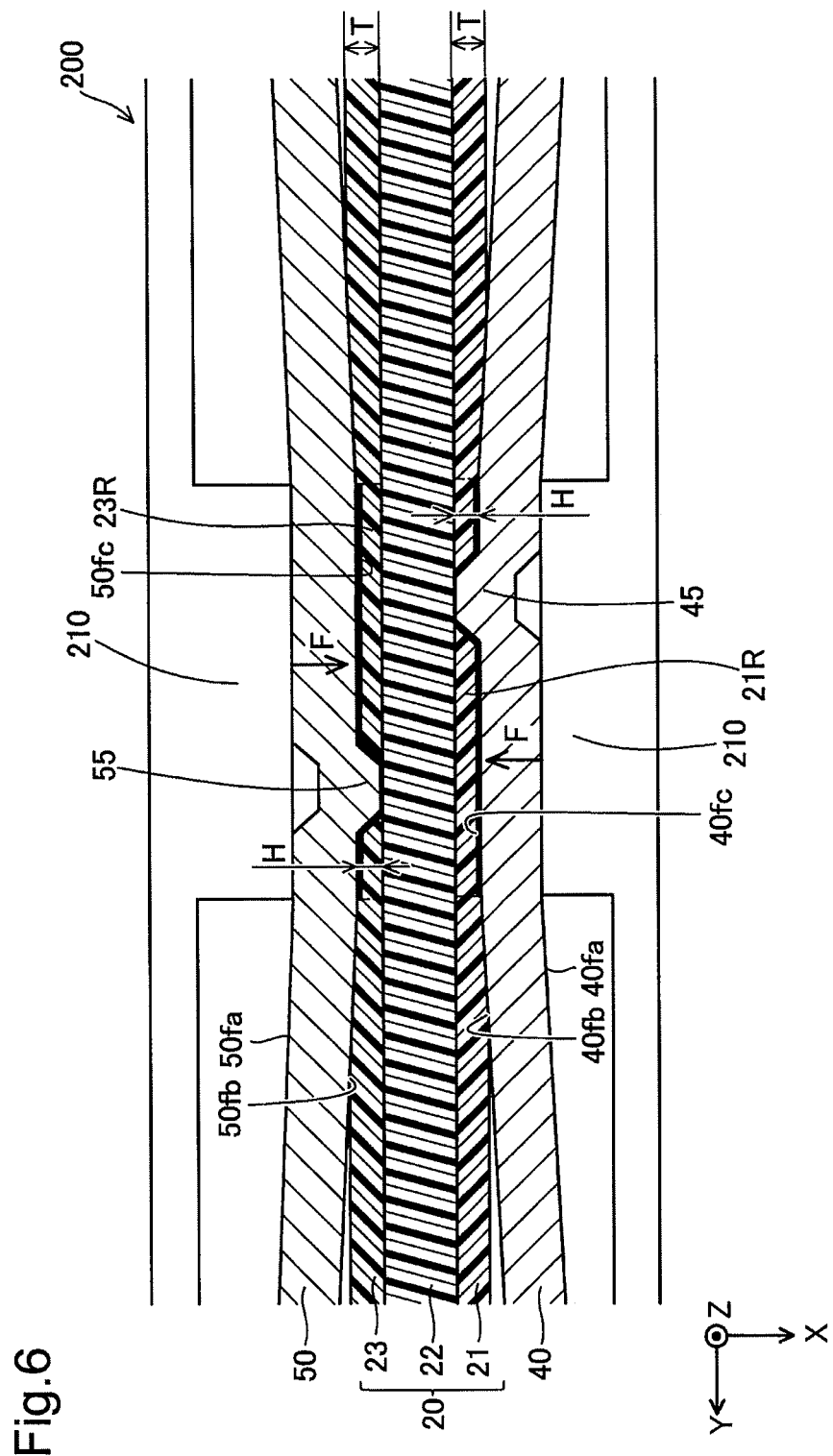
FIG. 6 is a diagram illustrating step S40 of FIG. 4.

FIG. 4 is a process flowchart showing a process of manufacturing the cell 140. FIG. 5 is a diagram illustrating step S30 of FIG. 4. FIG. 6 is a diagram illustrating step S40 of FIG. 4. In the seal member 20 of the cell 140 described with reference to FIG. 4, the core layer 22 is made of a first type of thermoplastic resin, and the two adhesive layers 21 and 23 are made of a second type of thermoplastic resin.

As shown in FIG. 4, the manufacturer first provides the MEGA 30 and the seal member 20 (step S10). The manufacturer subsequently bonds the seal member 20 to the periphery of the MEGA 30 (step S20). More specifically, the periphery of the MEGA 30 and the seal member 20 are bonded to each other by using an adhesive, for example, an ultraviolet cure resin including an olefin-based thermosetting sealing agent such as polyisobutylene (PIB).

After step S20, the manufacturer arranges the two separators 40 and 50 such that the MEGA 30 with the seal member 20 bonded thereto is placed between the two separators 40 and 50 (step S30). More specifically, as shown in FIG. 5, the second separator 50 is placed on the second adhesive layer 23-side such that the opposed surface 50fb of the second separator 50 is arranged to face the second adhesive layer 23. The first separator 40 is placed on the first adhesive layer 21-side such that the opposed surface 40fb of the first separator 40 is arranged to face the first adhesive layer 21. Each of the first adhesive layer 21 and the second adhesive layer 23 has a thickness T in the state without application of a load to the seal member 20 (in the state of the seal member 20 alone).

After step S30, the manufacturer bonds the seal member 20 to the two separators 40 and 50 (step S40). This completes manufacture of the cell 140. More specifically, as shown in FIG. 6, the adhesive regions 21R and 23R of the seal member 20 are liquefied (melted) or softened by using a hot pressing machine 200 and are then cooled down to be cured, so that the separators 40 and 50 are bonded to the seal member 20. At the cell-forming temperature of step S30, the core layer 22 is not liquefied (melted) or softened. The hot pressing machine 200 includes a pair of heat pressing members 210. The heat pressing members 210 are heated to a predetermined temperature (for example, a temperature in a range of 120° C. to 200° C.) by a heating source and are used to press the separators 40 and 50 against the seal member 20 with a predetermined load (pressing force) F that does not significantly deform the core layer 22. The hot pressing time may be set, for example, in a range of 2 seconds to 120 seconds. More specifically, the heat pressing members 210 are used to press the convexes 45 and 55 and the adhesive opposed surfaces 40fc and 50fc located in the peripheries of the respective convexes 45 and 55 of the separators 40 and 50 against the seal member 20. This causes at least the convexes 45 and 55 to dent the adhesive layers 21 and 23.

When the adhesive layers 21 and 23 are heated by the heat pressing members 210, areas including the adhesive regions 21R and 23R are melted and liquefied or are softened. The adhesive opposed surfaces 40fc and 50fc are further pressed against the melted or softened areas in the direction of clamping the seal member 20 (clamping direction). The convexes 45 and 55 bump into the core layer 22 during this pressing, so as to stop further move of the adhesive opposed surfaces 40fc and 50fc in the clamping direction. This configuration suppresses the first and the second separators 40 and 50 from further being pressed against the seal member 20 and thereby controls the pressing amounts of the first and the second separators 40 and 50 into the adhesive layers 21 and 23. In other words, this configuration ensures the thickness of about at least the height H as the thickness of the adhesive layers 21 and 23 in the adhesive regions 21R and 23R. This configuration accordingly reduces the possibility that the thickness of the adhesive layers 21 and 23 in the adhesive regions 21R and 23R is reduced significantly.

Additional processes after step S40, for example, a process of bonding the gaskets 92 to the opposite surface 50fa of the separator 50 and a process of stacking the plurality of cells 140 may be performed to manufacture the fuel cell stack 100. The process of bonding the gaskets 92 on the opposite surface 50fa of the separator 50 may be performed between step S20 and step S30.

When the core layer 22 is made of a thermoplastic resin having a Vicat softening temperature that is higher than room temperature and the two adhesive layers 21 and 23 are made of a thermosetting resin that is in the liquid form (paste form) at room temperature prior to curing, the manufacturer may provide the core layer 22 at step S10 and bond the core layer 22 to the periphery of the MEGA 30 at step S20. The manufacturer may subsequently apply the adhesive layers 21 and 23 in the paste form on the respective surfaces of the core layer 22 and then arrange the two separators 40 and 50 at step S30. The manufacturer may subsequently start pressing the separators 40 and 50 by using the hot pressing machine 200 at a temperature lower than the curing temperature of the adhesive layers 21 and 23 and then heat the heat pressing members 210 of the hot pressing machine 200 to the curing temperature or a higher temperature while continuing the pressing, so as to cure the adhesive layers 21 and 23 at step S40. In the process of bonding the separators 40 and 50 to the adhesive layers 21 and 23, even when the separators 40 and 50 are pressed against the adhesive layers 21 and 23 in a temperature environment that is lower than the temperature at which curing of the thermosetting resin starts, this configuration ensures the thickness of about at least the height H as the thickness of the adhesive layers 21 and 23 in the adhesive regions 21R and 23R. This configuration accordingly also reduces the possibility that the thickness of the adhesive layers 21 and 23 in the adhesive regions 21R and 23R is reduced significantly.

A-2. Reference Example to Describe Advantageous Effects of Embodiment

Figure 7:
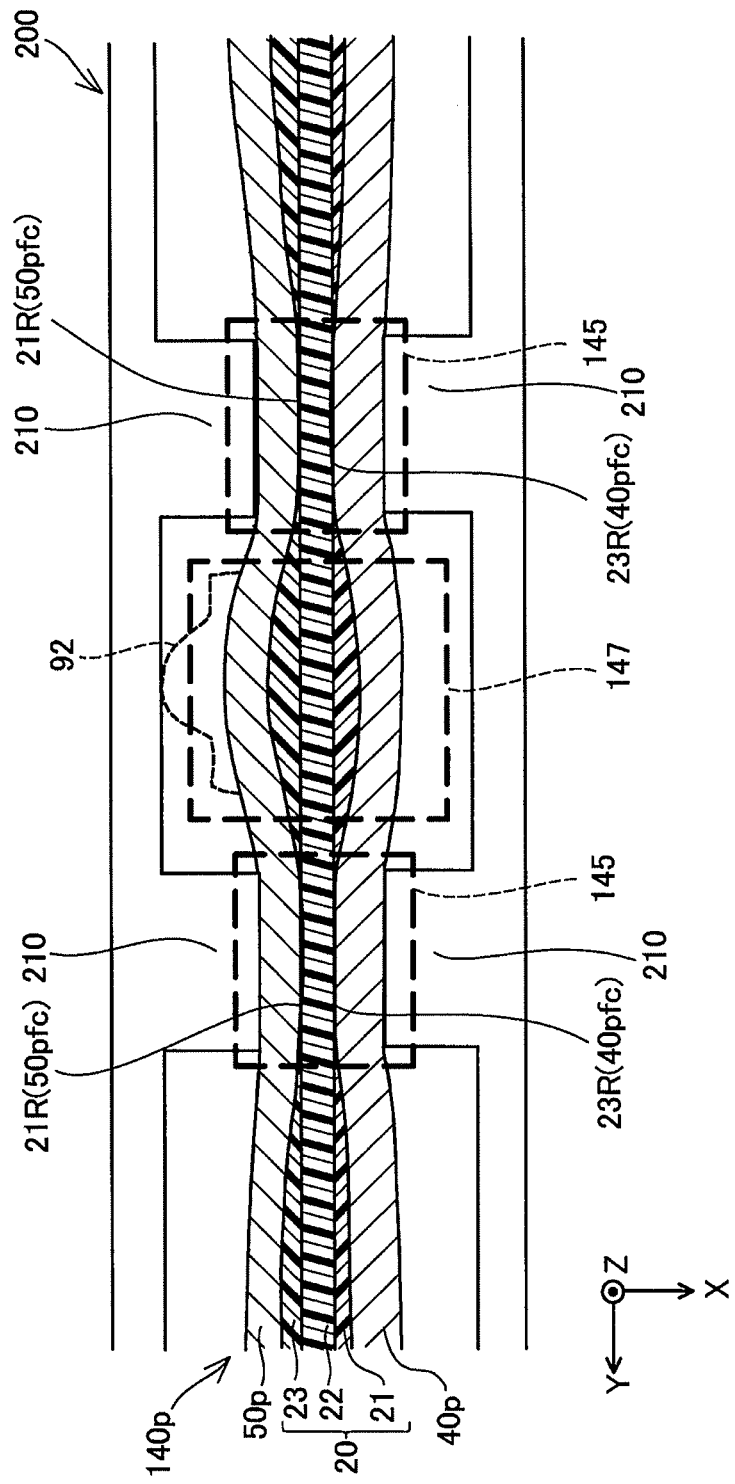
FIG. 7 is a diagram illustrating a reference example to describe advantageous effects of the embodiment.

FIG. 7 is a diagram illustrating a reference example to describe the advantageous effects of the embodiment. FIG. 7 is a diagram corresponding to FIG. 6. Separators 40*p* and 50*p* of the reference example differ from the separators 40 and 50 of the embodiment by only omission of convexes 45 and 55 that are protruded from adhesive opposed surfaces 40*pfc* and 50*pfc* toward the seal member 20 (shown in FIG. 6). Otherwise the configuration of the separators 40*p* and 50*p* and the configuration of the seal member 20 are similar to those of the above embodiment. The like components are thus expressed by the like reference signs and are not specifically described here.

At step S40, when the adhesive opposed surfaces 40*pfc* and 50*pfc* of the separators 40*p* and 50*p* are pressed against the seal member 20 by using the hot pressing machine 200, substantially the entire adhesive opposed surfaces 40*pfc* and 50*pfc* bump into the core layer 22. This stops further move of the adhesive opposed surfaces 40*pfc* and 50*pfc* in the clamping direction. This configuration causes greater amounts of the adhesive layers 21 and 23 placed in the adhesive regions 21R and 23R to be pressed away to the periphery by the adhesive opposed surfaces 40*pfc* and 50*pfc*. Since the greater amounts of the adhesive layers 21 and 23 are pressed away to the periphery, the thickness of the adhesive layers 21 and 23 in the adhesive regions 21R and 23R in this reference example becomes smaller than the thickness of the adhesive layers 21 and 23 in the above embodiment. This results in reducing the adhesive force between the adhesive layers 21 and 23 and the adhesive opposed surfaces 40*pfc* and 50*pfc*. The greater amounts of the adhesive layers 21 and 23 are pressed away to the periphery of the adhesive regions 21R and 23R, so that the thickness of the adhesive layers 21 and 23 becomes non-uniform in a cell 140*p* of the reference example. This provides the non-uniform thickness of the cell 140*p* and causes the stacked body of the seal member 20 and the separators 40*p* and 50*p* in the cell 140*p* to include portions of locally reduced thickness 145 and portions of locally increased thickness 147. When the gasket 92 is placed in a portion of locally reduced thickness 145, the gasket 92 is likely to provide an insufficient height and is thus likely to fail in tightly adhering to the separator 40 or 50 of another adjacent cell 140*p* and providing the sufficient sealing property between the adjacent cells 140 which is originally expected to be provided by the gasket 92. This may cause a leakage of the reactive gas or the cooling medium to outside of the cell 140*p*. When the gasket 92 is placed in a portion of locally increased thickness 147 as shown in FIG. 7, on the other hand, the gasket 92 is likely to be excessively compressed and damaged under application of a clamping load by the end plates 110A and 110B.

A-3. Advantageous Effects of Embodiment

In the embodiment described above, the separators 40 and 50 include the convexes 45 and 55 that are protruded from the opposed surfaces 40*fb* and 50*fb* in the direction toward the seal member 20 (as shown in FIG. 3). This configuration ensures the thickness of about at least the height H of the convexes 45 and 55 as the thickness of the adhesive layers 21 and 23 in the adhesive regions 21R and 23R in the bonding process. This configuration accordingly reduces the possibility that the thickness of the adhesive layers 21 and 23 in the adhesive regions 21R and 23R is reduced significantly, compared with a configuration that the separators 40 and 50 do not have convexes 45 and 55. This accordingly suppresses reduction of the adhesive force between the adhesive layers 21 and 23 and the adhesive opposed surfaces 40*fc* and 50*fc*. This also reduces the amounts of the adhesive layers 21 and 23 pressed away from the adhesive regions 21R and 23R to the periphery in the bonding process and thereby reduces the possibility that the thickness of the adhesive layers 21 and 23 becomes non-uniform. This accordingly reduces the possibility that the thickness of the seal member 20 becomes non-uniform.

In the embodiment described above, the convexes 45 and 55 provided in the separators 40 and 50 serve as barriers. This configuration suppresses the liquefied or softened adhesive layer 21 or 23 from flowing away in a wide area, for example, in the process of manufacturing the cell 140. For example, this reduces the possibility that the liquefied or softened adhesive layer 21 or 23 reaches the flow passage for supplying the reactive gas to the MEGA 30. The separators 40 and 50 include the convexes 45 and 55 that are formed continuously without interruptions. This makes the separators 40 and 50 unlikely to be bent in the stacking direction. For example, even when a force is applied to bend the separators 40 and 50 along a line F2-F2 shown in FIG. 2, the presence of the convexes 45 and 55 makes the separators 40 and 50 unlikely to be bent.

In the embodiment describe above, the presence of the convexes 45 and 55 increases the adhesive surface areas that adhere to the adhesive layers 21 and 23 and thereby improves the adhesive force between the separators 40 and 50 and the adhesive layers 21 and 23. The side face of each of the convexes 45 and 55 is arranged to include a component in a direction of peeling off the separator 40 or 50 from the adhesive layer 21 or 23 (X-axis direction). Even when a force is applied in a direction of peeling off the separator 40 or 50 from the adhesive layer 21 or 23, the side face of the convex 45 or 55 that adheres to the adhesive layer 21 or 23 reduces the possibility that the separator 40 or 50 is peeled off from the adhesive layer 21 or 23.

B. Other Embodiments with Regard to Positions of Convexes

The convexes 45 and 55 may be arranged in a specific region of the opposed surfaces 40*fb* and 50*fb* of the separators 40 and 50 when a plurality of cells 140 are stacked and a predetermined load is applied to the plurality of cells 140 to compress the cells 140 in the stacking direction. The specific region herein denotes a region in the separator 40 or 50 that applies a higher load to the seal member 20 than the circumference of the specific region. The following describes concrete examples of the specific region.

B-1. First Concrete Example

Figure 8:
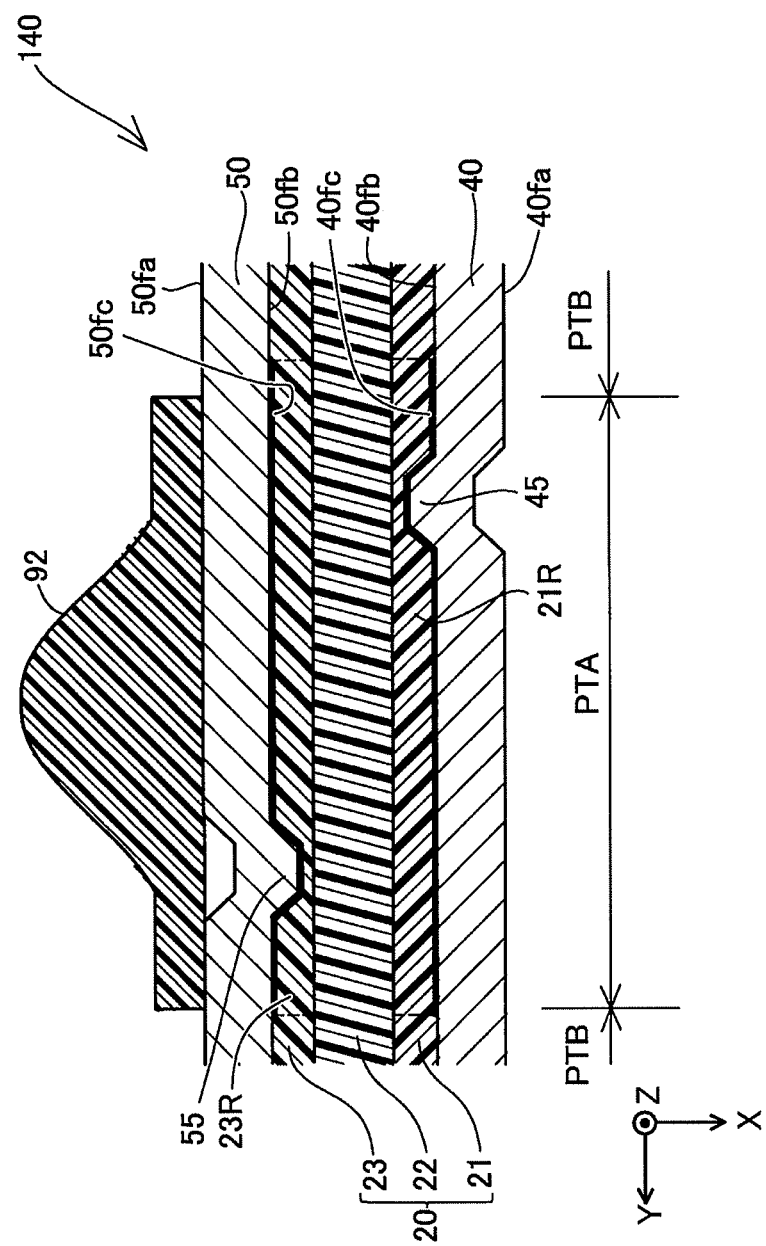
FIG. 8 is a diagram illustrating a first concrete example of a specific region.

FIG. 8 is a diagram illustrating a first concrete example of the specific region. In the above embodiment, the convexes 45 and 55 are arranged at the positions that do not overlap with the gasket 92 when the cell 140 is viewed along the stacking direction of the plurality of cells 140 (X-axis direction) (as shown in FIG. 3). As shown in FIG. 8, however, the convexes 45 and 55 may be arranged at positions that overlap with the gasket 92. The cell 140 has the following relationship in the state that the plurality of cells 140 are stacked and a predetermined load is applied to the plurality of cells 140 in the compressing direction of the stacking direction (X-axis direction). When the cell 140 is viewed along the stacking direction, a specific region PTA of the separators 40 and 50 that is overlapped with the gasket 92 applies a higher load to the seal member 20, compared with regions PTB that are located in the periphery of the specific region PTA and are not overlapped with the gasket 92. The adhesive layers 21 and 23 of the seal member 20 are pressed by the specific region PTA of the separators 40 and 50 and are thereby deformed in the compressing direction. The convexes 45 and 55 provided in the specific region PTA, however, bump into the core layer 22. This configuration reduces the possibility that the thickness of part of the adhesive layers 21 and 23 of the seal member 20 is significantly reduced. The adhesive layers 21 and 23 of the seal member 20 thus ensure the thickness of about the height of the convexes 45 and 55. This configuration suppresses a portion of the separators 40 and 50 that is overlapped with the gasket 92 in the stacking direction from being displaced in the stacking direction. This configuration accordingly maintains the degree of compression of the gasket 92 to the level that ensures the sealing property. In other words, this suppresses reduction of the pressure applied to the separators 40 and 50 by the gasket 92 (sealing linear pressure). With regard to the above embodiment, this concrete example and other concrete examples described below, it is preferable that the core layer 22 has the higher hardness as the measurement value using a durometer than those of the adhesive layers 21 and 23 in a temperature range (for example, −30° C. to 100° C.) to which the seal member 20 is exposed in the use environment of the fuel cell system 10. This configuration more effectively suppresses deformation of the core layer 22 when the convexes 45 and 55 bump into the core layer 22 and thereby more effectively ensures the thickness of about the height H of the convexes 45 and 55 as the thickness of the adhesive layers 21 and 23. The specific region PTA corresponds to the "first specific region" and the "second specific region" described in SUMMARY.

B-2. Second Concrete Example

Figure 9:
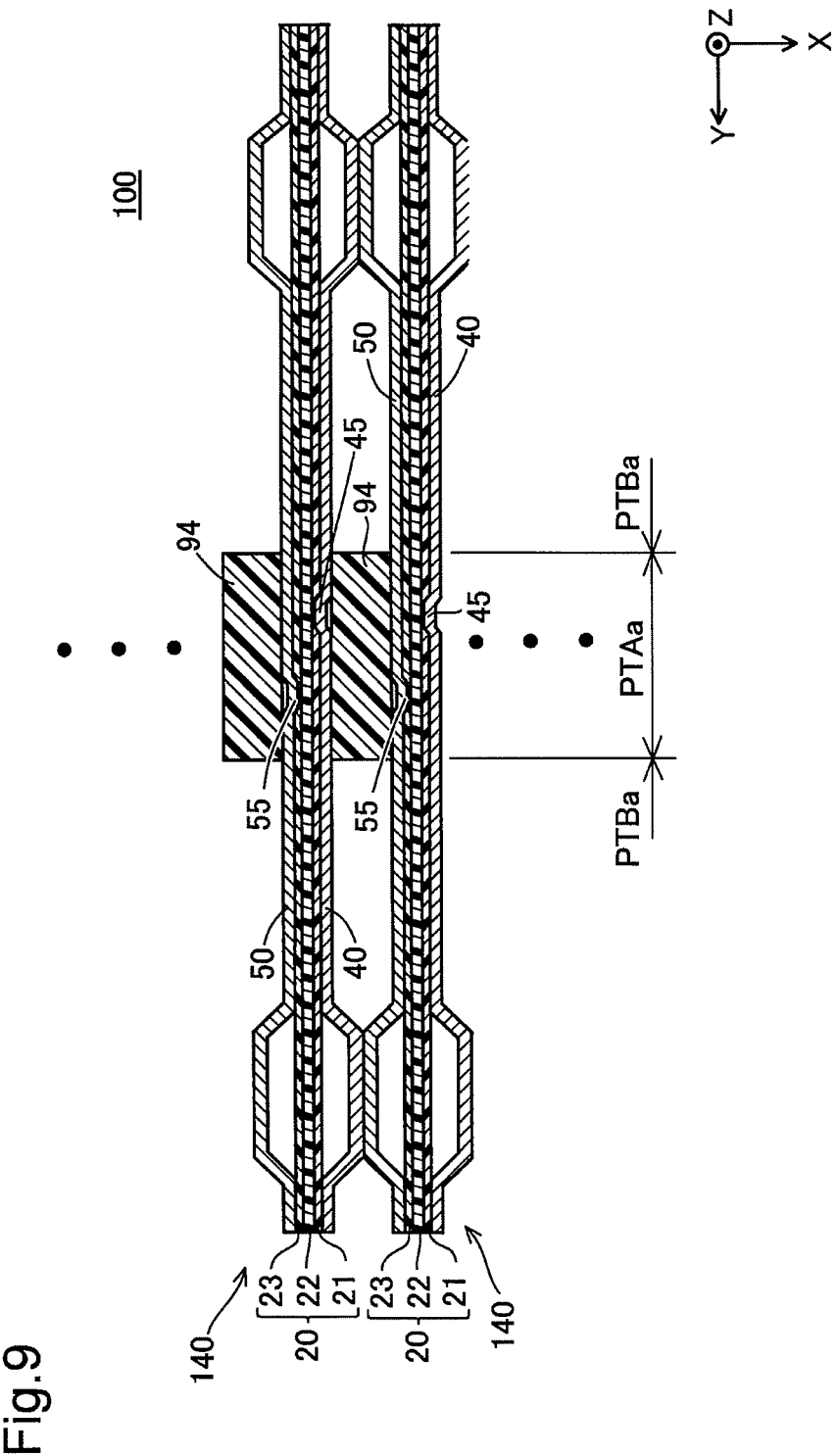
FIG. 9 is a diagram illustrating a second concrete example.

FIG. 9 is a diagram illustrating a second concrete example. The fuel cell stack 100 may include wall-like members 94 configured to keep constant intervals between the separators 40 and 50 of the respective adjacent cells 140. The wall-like member 94 is placed between the separators 40 and 50 of the adjacent cells 140 to be in contact with the separators 40 and 50 of the adjacent cells 140. The wall-like member 94 may be a rubber member made of, for example, butyl rubber or ethylene propylene rubber. In the clamped state of the fuel cell stack 100, when the cell 140 is viewed along the stacking direction, a specific region PTAa of the separators 40 and 50 that is overlapped with the wall-like member 94 applies a higher load to the seal member 20, compared with regions PTBa that are located in the periphery of the specific region PTAa and are not overlapped with the wall-like member 94. When the cell 140 is viewed along the stacking direction of the plurality of cells 140 (X-axis direction), convexes 45 and 55 may be provided at positions on the opposed surfaces 40fb and 50fb of the separators 40 and 50 that are overlapped with the wall-like member 94. In the clamped state of the fuel cell stack 100, the seal member 20 is pressed by the specific region PTAa and is thereby deformed in the compressing direction. The convexes 45 and 55 provided in the specific region PTAa, however, bump into the core layer 22. The adhesive layers 21 and 23 of the seal member 20 thus ensure the thickness of about the height of the convexes 45 and 55. This configuration suppresses a portion of the separators 40 and 50 that is overlapped with the wall-like member 94 in the stacking direction from being displaced in the stacking direction. This configuration accordingly controls the degree of displacement of the wall-like member 94 in the stacking direction. The specific region PTAa corresponds to the "first specific region" and the "second specific region" described in SUMMARY.

B-3. Third Concrete Example

Figure 10:
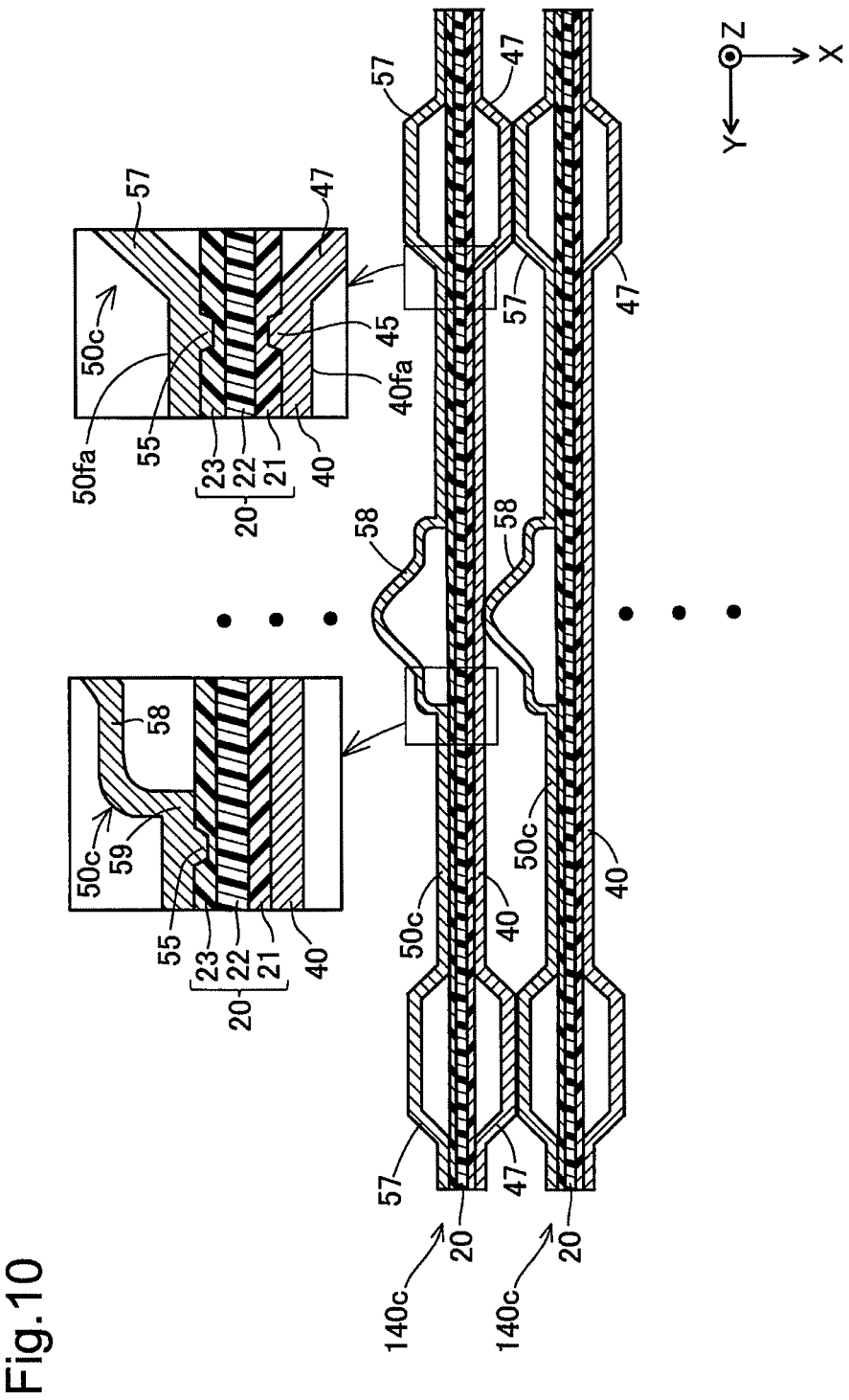
FIG. 10 is a diagram illustrating a third concrete example and a fourth concrete example.

FIG. 10 is a diagram illustrating a third concrete example and a fourth concrete example. In the fuel cell stack 100, a seal structure, in place of the gasket 92, may be provided integrally with the separator 40 or 50 to seal between the adjacent separators 40 and 50. FIG. 10 illustrates a configuration that a second separator 50c is provided integrally with a seal structure 58. The seal structure 58 is a projection that is provided to be protruded from the opposite surface 50fa. The seal structure 58 is formed by press-forming the second separator 50c. The seal structure 58 has spring elasticity and is elastically deformed to be compressed in the stacking direction in the clamped state of the fuel cell stack 100. In the clamped state of the fuel cell stack 100, the vicinity of a connecting region 59 of the second separator 50c that is connected with the seal structure 58 is a specific region (second specific region). Accordingly the vicinity of the connecting region 59 applies a higher load to the seal member 20, compared with a region located in the periphery of the connecting region 59. By the same reason as that of the first concrete example, a convex 55 may be placed in the specific region of the second separator 50c. In the first separator 40, a convex 45 may be placed in a region (first specific region) that overlaps in the stacking direction with a contact portion that comes into contact with the seal structure 58 of the adjacent second separator 50c directly or via another member (for example, a thin-film rubber member). This first specific region applies a higher load to the seal member 20, compared with the periphery of the first specific region of the first separator 40.

B-4. Fourth Concrete Example

Convexes 45 and 55 may be arranged in the vicinity of areas where the inclination suppressing portions 47 and 57 are connected with the opposite surfaces 40fa and 50fa (i.e., in first and second specific regions) as shown in FIG. 10. This first specific region applies a higher load to the seal member 20, compared with a region of the separator 40 that is located in the periphery of the first specific region. The second specific region also applies a higher load to the seal member 20, compared with a region of the separator 50 that is located in the periphery of the second specific region. Even when the seal member 20 is deformed in the compressing direction by placing the convex 45 in the first specific region and placing the convex 55 in the second specific region, the adhesive layers 21 and 23 of the seal member 20 thus ensure the thickness of about the height of the convexes 45 and 55. This configuration controls the degree of displacement of the inclination suppressing portions 47 and 57 in the stacking direction.

C. Modifications

The above embodiment describes one exemplified configuration of the fuel cell. The configuration of the cell may, however, be modified, altered or changed in any of various ways. For example, some components may be added, may be omitted or may be exchanged.

C-1. First Modification

In the embodiment described above, each of the convexes 45 and 55 has the trapezoidal sectional shape in the direction perpendicular to the direction in which the convex 45 or 55 is continuous (as shown in FIG. 3). The sectional shape is, however, not limited to this embodiment. For example, the sectional shape of the convex 45 or 55 may be a semicircular shape or a triangular shape. Each of the convexes 45 and 55 may be a single convex or may consist of multiple convexes. In other words, each of the convexes 45 and 55 may be arranged to form a single line along each of the manifolds 62, 64, 72, 74, 76 and 78 or may be arranged to form double or multiple lines along each of the manifolds 62, 64, 72, 74, 76 and 78. In the above embodiment, each of the convexes 45 and 55 is formed continuously without interruptions along each of the manifolds 62, 64, 72, 74, 76 and 78. This configuration is, however, not essential. For example, when the cell 140 is viewed along the stacking direction, convexes 45 or 55 in a dot-like shape or in an oval shape may be arranged along each of the manifolds 62, 64, 72, 74, 76 and 78. Accordingly the convexes 45 or 55 may be arranged at predetermined intervals along each of the manifolds 62, 64, 72, 74, 76 and 78. In the above embodiment, the convex 45 and the convex 55 are arranged alternately to be not overlapped with each other when the cell 140 is viewed along the stacking direction of the plurality of cells 140 (as shown in FIG. 2). This configuration is, however, not essential. For example, the convex 45 and the convex 55 may be arranged at positions that are overlapped with each other or may be arranged at positions that intersect with each other, when the cell 140 is viewed along the stacking direction of the plurality of cells 140.

The disclosure is not limited to any of the embodiments, the examples and the modifications described above but may be implemented by a diversity of other configurations without departing from the scope of the disclosure. For example, the technical features of any of the embodiments, the examples and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A fuel cell, comprising:
a membrane electrode gas diffusion layer assembly including a membrane electrode assembly in which electrodes are arranged on respective surfaces of an electrolyte membrane, and gas diffusion layers that are arranged on respective surfaces of the membrane electrode assembly;
a seal member in a film-like form that is arranged in a periphery of the membrane electrode gas diffusion layer assembly; and
a first separator and a second separator that are arranged such as to place the membrane electrode gas diffusion layer assembly and the seal member therebetween, wherein
the seal member includes a first adhesive layer that is arranged to face the first separator, a second adhesive layer that is arranged to face the second separator, and a core layer that is placed between the first adhesive layer and the second adhesive layer and is harder than the first adhesive layer and the second adhesive layer,
the core layer has a constant thickness,
the first separator includes a first opposed surface that is arranged to face the first adhesive layer and a first convex that is protruded from the first opposed surface in a direction toward the seal member to dent the first adhesive layer, and
the second separator includes a second opposed surface that is arranged to face the second adhesive layer and a second convex that is protruded from the second opposed surface in a direction toward the seal member to dent the second adhesive layer, wherein
a circumference of the first convex in the first opposed surface adheres to the first adhesive layer, and
a circumference of the second convex in the second opposed surface adheres to the second adhesive layer, and wherein
when a plurality of the fuel cells are stacked and a predetermined load is applied to the plurality of fuel cells in a stacking direction,
the first convex is arranged in a first specific region of the first separator that applies a higher load to the seal member, compared with a periphery of the first specific region in the first separator, and
the second convex is arranged in a second specific region of the second separator that applies a higher load to the seal member, compared with a periphery of the second specific region in the second separator.

2. The fuel cell according to claim 1, wherein the first convex and the second convex are arranged at positions that are not opposed to each other across the seal member.

3. The fuel cell according to claim 1, wherein each of the first specific region and the second specific region is a region that is overlapped with an inter-cell seal member placed between an adjacent pair of the fuel cells, when the fuel cell is viewed along the stacking direction.

4. The fuel cell according to claim 1, wherein the core layer is made of a first type of thermoplastic resin, and
each of the first adhesive layer and the second adhesive layer is made of a second type of thermoplastic resin that is different from the first type of thermoplastic resin, wherein
the core layer has a higher Vicat softening temperature than the first adhesive layer and the second adhesive layer.

5. The fuel cell according to claim 1,
wherein the core layer is made of a thermoplastic resin, and
each of the first adhesive layer and the second adhesive layer is made of a thermosetting resin.

* * * * *